United States Patent
Jang

(10) Patent No.: US 6,757,578 B1
(45) Date of Patent: Jun. 29, 2004

(54) SEMICONDUCTOR FACTORY AUTOMATION SYSTEM AND METHOD FOR PROCESSING LOT OF SEMICONDUCTOR WAFERS AT FULL-AUTOMATION MODE OR SEMI-AUTOMATION MODE

(75) Inventor: Bo-Soon Jang, Ichon-shi (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 770 days.

(21) Appl. No.: 09/599,398

(22) Filed: Jun. 22, 2000

(30) Foreign Application Priority Data

Jun. 22, 1999 (KR) ........................ 1999-23543

(51) Int. Cl.⁷ .............................................. G06F 19/00
(52) U.S. Cl. ...................................... 700/100; 700/121
(58) Field of Search ........................... 700/2–5, 19, 20, 700/95, 99–102, 112, 117–121, 179

(56) References Cited

U.S. PATENT DOCUMENTS

| | | | |
|---|---|---|---|
| 4,571,685 A | 2/1986 | Kamoshida | 364/468 |
| 4,901,242 A | 2/1990 | Kotan | 364/468 |
| 5,111,404 A | 5/1992 | Kotani | 364/468 |
| 5,231,585 A | 7/1993 | Kobayashi et al. | 364/468 |
| 5,262,954 A | 11/1993 | Fujino et al. | 364/468 |
| 5,375,062 A | 12/1994 | Aoki | 364/468 |
| 5,402,349 A | 3/1995 | Fujita et al. | 364/468 |
| 5,432,702 A * | 7/1995 | Barnett | 700/116 |
| 5,440,493 A | 8/1995 | Doida | 364/468 |
| 5,495,417 A | 2/1996 | Fuduka et al. | 364/468 |
| 5,555,179 A | 9/1996 | Koyama et al. | 364/468.01 |
| 5,579,231 A | 11/1996 | Sudou et al. | 364/468.01 |
| 5,596,712 A | 1/1997 | Tsuyama et al. | 395/183.02 |
| 5,699,242 A * | 12/1997 | Togawa et al. | 700/5 |
| 5,867,389 A * | 2/1999 | Hamada et al. | 700/121 |
| 6,185,474 B1 * | 2/2001 | Nakamura et al. | 700/121 |
| 6,424,881 B1 * | 7/2002 | Steffan et al. | 700/121 |
| 6,438,441 B1 * | 8/2002 | Jang et al. | 700/121 |
| 6,473,664 B1 * | 10/2002 | Lee et al. | 700/110 |

FOREIGN PATENT DOCUMENTS

| | | | |
|---|---|---|---|
| EP | 0837494 A2 | 4/1998 | H01L/21/00 |
| GB | 2233790 A | 1/1991 | G05B/19/417 |
| JP | WO98/10890 | 3/1998 | B23O/41/08 |

* cited by examiner

Primary Examiner—Maria N. Von Buhr
(74) Attorney, Agent, or Firm—Jacobson Holman PLLC

(57) ABSTRACT

A method for processing a lot of semiconductor wafers in a semiconductor factory automation (FA) system, wherein the lot is defined as a predetermined number of semiconductor wafers, includes the steps of: a) determining whether a first process equipment operable at a first operating mode has a job file corresponding to the lot of semiconductor wafers, wherein the job file represents data required for a semiconductor process; b) if the first process equipment operable at the first operating mode has the job file, processing the lot of semiconductor wafers according to the job file in the first process equipment; c) if the first process equipment operable at the first operating mode has not the job file, providing the job file to a second process equipment operable at a second operating mode; and d) processing the lot of semiconductor wafers according to the job file in the second process equipment. The method can effectively process a lot of semiconductor wafers at a full-automation mode or a semi-automation mode.

32 Claims, 3 Drawing Sheets

SEMICONDUCTOR FACTORY AUTOMATION SYSTEM AND METHOD FOR PROCESSING LOT OF SEMICONDUCTOR WAFERS AT FULL-AUTOMATION MODE OR SEMI-AUTOMATION MODE

FIELD OF THE INVENTION

The present invention relates to a semiconductor factory automation (hereinafter, referred to as FA) system, and, more particularly, to a semiconductor FA system and method for processing a lot of semiconductor wafers at a full-automation mode or a semi-automation mode.

DESCRIPTION OF THE PRIOR ART

Generally, a conventional semiconductor FA system includes at least one cell. The cell includes a plurality of semiconductor production bays. One of the semiconductor production bays includes process equipments, stockers and an automatic guide vehicle (hereinafter, referred to as AGV). A process equipment processes a lot of semiconductor wafers to obtain semiconductor devices. The process equipments include an etching equipment, a furnace equipment, a photo-lithography equipment, an overlay equipment and the like. A stocker temporarily stocks a semiconductor wafer cassette to be transported from a semiconductor production bay to another semiconductor production bay and the semiconductor wafer cassette processed in the process equipment. The semiconductor wafer cassette is a container capable of containing a plurality of semiconductor wafers.

Further, the conventional semiconductor FA system is employed in an operating mode, wherein the operating mode includes a semi-automation mode and a full-automation mode. Accordingly, the conventional semiconductor FA system strongly needs a scheme capable of effectively processing the lot of the semiconductor wafers at the full-automation mode or the semi-automation mode.

SUMMARY OF THE INVENTION

It is, therefore, an object of the present invention to provide a semiconductor FA system and method that is capable of effectively assigning semiconductor equipments to a full-automation mode or a semi-automation mode for processing a lot of semiconductor wafers depending on the presence of a job file in each semiconductor equipment.

It is, therefore, another object of the present invention to provide a computer-readable media storing program instructions, the program instructions disposed on a computer to perform a method that is capable of effectively processing a lot of semiconductor wafers at a full-automation mode or a semi-automation mode.

In accordance with an aspect of the present invention, there is provided an apparatus for processing a lot of semiconductor wafers, wherein the lot is defined as a predetermined number of semiconductor wafers, comprising: a first semiconductor processing means operable at a first operating mode for processing the lot of the semiconductor wafers according to a job file representing data required for a semiconductor process; a second semiconductor processing means operable at a second operating mode for processing the lot of the semiconductor wafers according to the job file; a determining means for determining whether said first semiconductor processing means has the job file; and a providing means for providing the job file to said second semiconductor processing means if said first semiconductor processing means has not the job file.

In accordance with another aspect of the present invention, there is provided a semiconductor factory automation (FA) system for processing a lot of semiconductor wafers, wherein the lot is defined as a predetermined number of semiconductor wafers, comprising: a first semiconductor processing means operable at a first operating mode for processing the lot of the semiconductor wafers according to a job file representing data required for a semiconductor process; a second semiconductor processing means operable at a second operating mode for processing the lot of the semiconductor wafers according to the job file; a determining means for determining whether said first semiconductor processing means has the job file; and a providing means for providing the job file to said second semiconductor processing means if said first semiconductor processing means has not the job file.

In accordance with further another aspect of the present invention, there is provided a method for processing a lot of semiconductor wafers in a semiconductor factory automation (FA) system, wherein the lot is defined as a predetermined number of semiconductor wafers, comprising the steps of: a) determining whether a first process equipment operable at a first operating mode has a job file corresponding to the lot of semiconductor wafers, wherein the job file represents data required for a semiconductor process; b) if the first process equipment operable at the first operating mode has the job file, processing the lot of semiconductor wafers according to the job file in the first process equipment; c) if the first process equipment operable at the first operating mode has not the job file, providing the job file to a second process equipment operable at a second operating mode; and d) processing the lot of semiconductor wafers according to the job file in the second process equipment.

In accordance with still further another aspect of the present invention, there is provided a computer-readable media storing program instructions, the program instructions disposed on a computer to perform a method for processing a lot of semiconductor wafers in a semiconductor factory automation (FA) system, wherein the lot is defined as a predetermined number of semiconductor wafers, comprising the steps of: a) determining whether a first process equipment operable at a first operating mode has a job file corresponding to the lot of semiconductor wafers, wherein the job file represents data required for a semiconductor process; b) if the first process equipment operable at the first operating mode has the job file, processing the lot of semiconductor wafers according to the job file in the first process equipment; c) if the first process equipment operable at the first operating mode has not the job file, providing the job file to a second process equipment operable at a second operating mode; and d) processing the lot of semiconductor wafers according to the job file in the second process equipment.

BRIEF DESCRIPTION OF THE DRAWINGS

The above and other objects and features of the present invention will become apparent from the following description of the preferred embodiment given in connection with the accompanying drawings, in which.

DETAILED DESCRIPTION OF THE PREFERRED EMBODIMENTS

Figure 1:
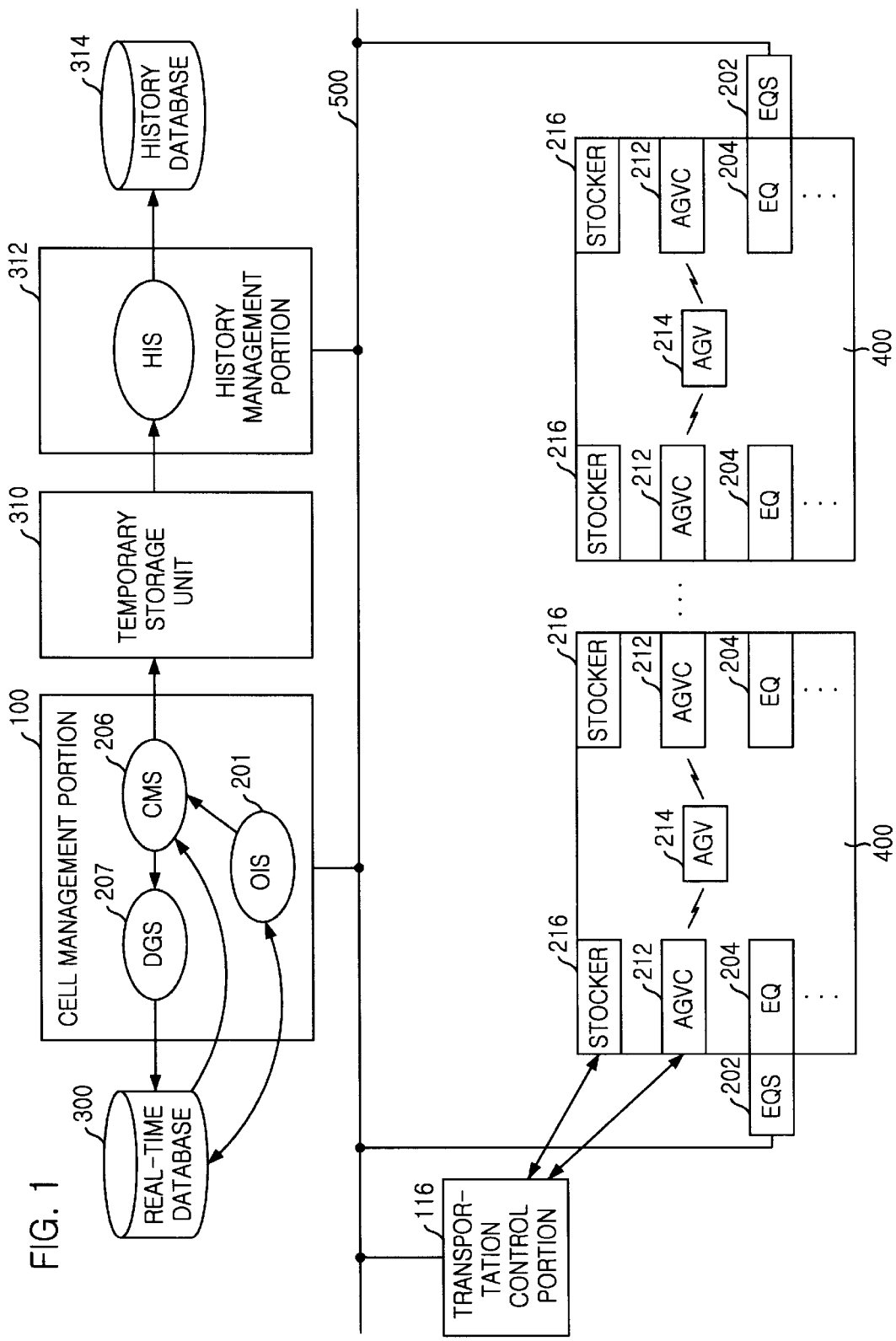
FIG. 1 is a block diagram showing a semiconductor FA system for processing a lot of semiconductor wafers at a semi-automation mode or a full-automation mode in accordance with the present invention.

Referring to FIG. 1, there is shown a block diagram showing a semiconductor FA system for processing a lot of semiconductor wafers at a semi-automation mode or a full-automation mode in accordance with the present invention. As shown, the semiconductor FA system includes at least one cell, which has a predetermined number, e.g., 4, of semiconductor production bays. A semiconductor production bay 400 is included in a cell. A semiconductor production bay 400 is provided with EQs 204, stockers 216 and an AGV 214. The EQ 204 processes semiconductor wafers in order to obtain semiconductor devices. The EQ 204 includes, e.g., an etching equipment, a photo-lithography equipment, an overlay equipment, a furnace equipment, a physical vapor deposition (PVD) equipment, a sputtering equipment and the like. A stocker 216 temporarily stocks a number of semiconductor wafer cassettes. Each of semiconductor wafer cassettes has a predetermined number of semiconductor wafers, which is referred to as a lot. The semiconductor wafer cassettes are selectively transported to the EQ 204 by using the AGV 214. The semiconductor wafer cassette stored in the stocker 216 is transported to another semiconductor production bay 400.

A process equipment server (hereinafter, referred to as EQS) 202 is coupled to a common communication line 500, e.g., Ethernet™ supplied by Xerox Corporation. An AGV controller (hereinafter, referred to as AGVC) 212 controls the AGV 214.

The semiconductor FA system also includes a cell management portion 100, a real-time database 300 connected to the cell management portion 100, a temporary storage unit 310, a history management portion 312 connected to the temporary storage unit 310 and a history database 314 connected to the history management portion 312. The cell management portion 100, the history management portion 312 and the history database 314 are respectively connected to the common communication line 500 for communication therebetween.

The cell management portion 100 includes a cell management server (hereinafter, referred to as CMS) 206, an operator interface server (OIS) 201 and a data gathering server (DGS) 207. The DGS 207 stores process data associated with the lot in the real-time database 300.

The CMS 206 determines whether the EQ 204, e.g., an overlay equipment, operable at the full-automation mode has a job file corresponding to the lot of semiconductor wafers, wherein the job file represents data required for a semiconductor process. The job file has identification information of a semiconductor process and an executable file for executing the semiconductor process. The overlay equipment images a predetermined pattern of a mask on each semiconductor wafer. If the EQ 204 operable at the full-automation mode has the job file corresponding to the lot of semiconductor wafers, the CMS 206 assigns the semiconductor process to the EQ 204 operable at the full-automation mode. The CMS 206 sends a transportation command to the AGV 214 so that the lot of semiconductor wafers can be transported to the EQ 204 operable at the full-automation mode. The AGV 214, responsive to the transportation command, transports the lot of semiconductor wafers to the EQ 204 operable at the full-automation mode. The EQ 204 operable at the full-automation mode processes the lot of semiconductor wafers according to the job file. That is, the EQ 204 operable at the full-automation mode images the predetermined pattern of the mask on each semiconductor wafer according to the job file.

If the EQ 204, e.g., the overlay equipment, operable at the full-automation mode has not the job file corresponding to the lot of semiconductor wafers, the CMS 206 provides the job file to the EQ 204 operable at the semi-automation mode. The CMS 206 assigns the semiconductor process to the EQ 204 operable at the semi-automation mode. The CMS 206 sends the transportation command to the AGV 214 so that the lot of semiconductor wafers can be transported to the EQ 204 operable at the semi-automation mode. The AGV 214, responsive to the transportation command, transports the lot of semiconductor wafers to the EQ 204 operable at the semi-automation mode. The EQ 204 operable at the semi-automation mode processes the lot of semiconductor wafers according to the job file. That is, the EQ 204 operable at the semi-automation mode images the predetermined pattern of the mask on each semiconductor wafer according to the job file.

Figure 2:
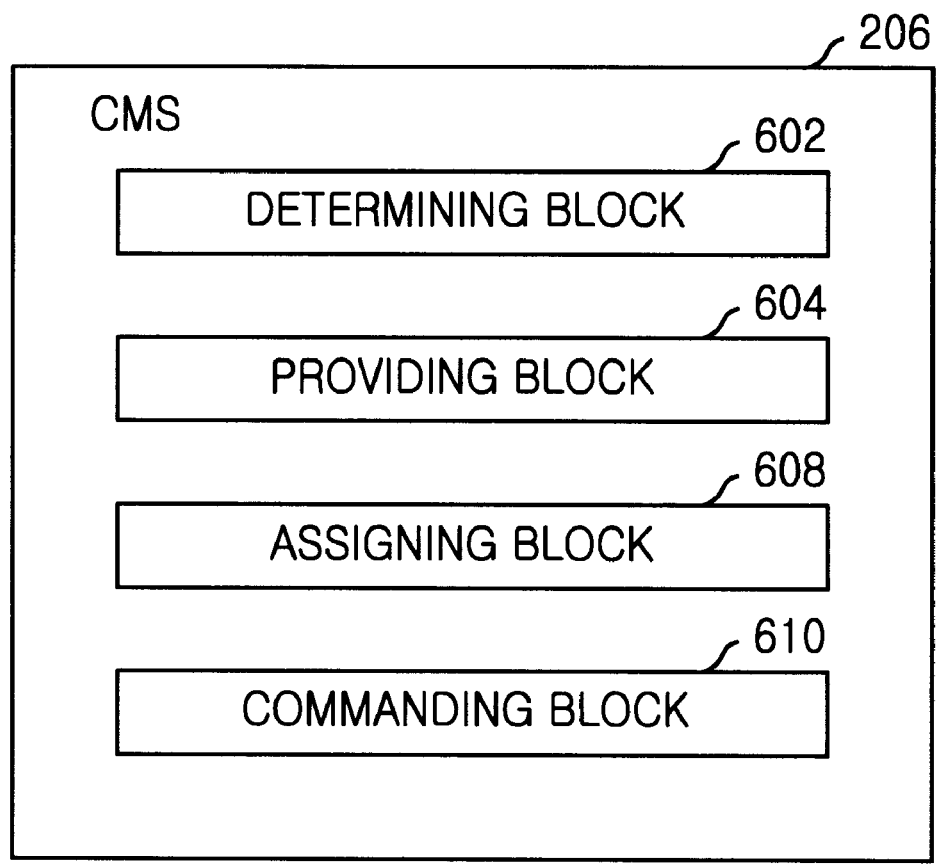
FIG. 2 is a block diagram depicting a cell management server (CMS) shown in FIG. 1.

Referring to FIG. 2, there is shown a block diagram depicting a cell management server (CMS) shown in FIG. 1.

As shown, the CMS 206 includes a determination block 602, a providing block 604, an assigning block 608 and a commanding block 610. The determining block 602 determines whether the EQ 204 operable at the full-automation mode has a job file corresponding to the lot of semiconductor wafers, wherein the job file, representing data required for a semiconductor process, has identification information of the semiconductor process and an executable file for executing the semiconductor process.

If the EQ 204 operable at the full-automation mode has the job file corresponding to the lot of semiconductor wafers, the assigning block 608 assigns a semiconductor process to the EQ 204 operable at the full-automation mode. Then, the commanding block 610 sends a transportation command to the AGV 214 so that the lot of semiconductor wafers can be transported to the EQ 204 operable at the full-automation mode.

If the EQ 204 operable at the full-automation mode has not the job file corresponding to the lot of semiconductor wafers, the providing block 604 provides the job file to the EQ 204 operable at the semi-automation mode. Then, the assigning block 608 assigns the semiconductor process to the EQ 204 operable at the semi-automation mode. The commanding block 610 sends the transportation command to the AGV 214 so that the lot of semiconductor wafers can be transported to the EQ 204 operable at the semi-automation mode.

Figure 3:
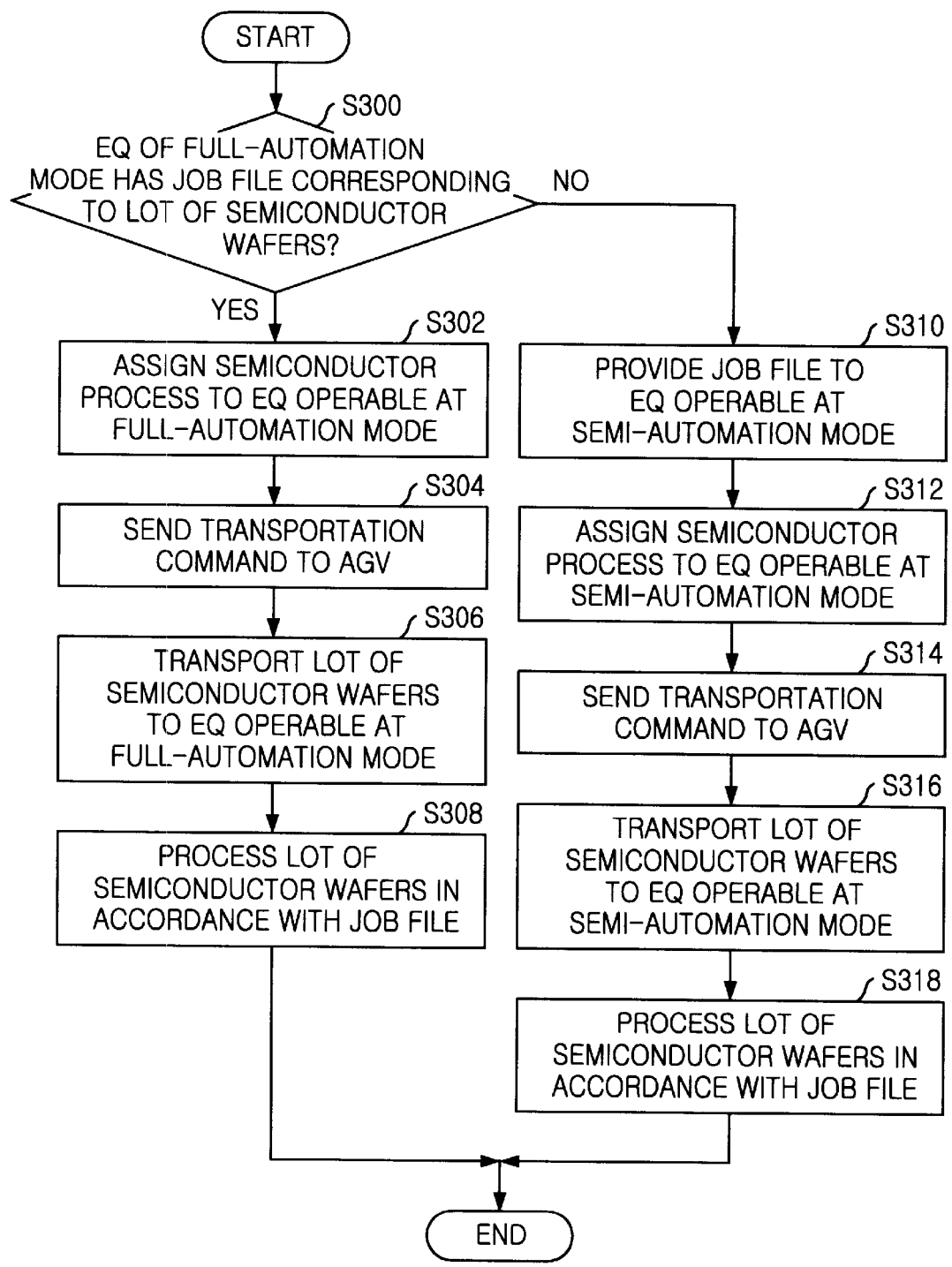
FIG. 3 is a flowchart illustrating a method for processing a lot of semiconductor wafers at a semi-automation mode or a full-automation mode in accordance with the present invention.

Referring to FIG. 3, there is shown a flowchart illustrating a method for processing a lot of semiconductor wafers at a semi-automation mode or a full-automation mode in accordance with the present invention.

At step S300, the determining block 602 of the CMS 206 determines whether the EQ 204, e.g., an overlay equipment, operable at the full-automation mode has a job file corresponding to the lot of semiconductor wafers, wherein the job file represents data required for a semiconductor process. The job file has identification information of the semiconductor process and an executable file for executing the semiconductor process.

At step S302, if the EQ 204 operable at the full-automation mode has the job file corresponding to the lot of semiconductor wafers, the assigning block 608 of the CMS 206 assigns a semiconductor process to the EQ 204 operable at the full-automation mode.

At step S304, the commanding block 610 of the CMS 206 sends a transportation command to the AGV 214 so that the lot of semiconductor wafers can be transported to the EQ 204 operable at the full-automation mode.

At step S306, the AGV 214, responsive to the transportation command, transports the lot of semiconductor wafers to the EQ 204 operable at the full-automation mode.

At step S308, the EQ 204 operable at the full-automation mode processes the lot of semiconductor wafers according to the job file. That is, the EQ 204 operable at the full-automation mode applies an overlay process to the lot of semiconductor wafers according to the job file.

At step S310, if the EQ 204, e.g., the overlay equipment, operable at the full-automation mode has not the job-file corresponding to the lot of semiconductor wafers, the providing block 604 of the CMS 206 provides the job file to the EQ 204 operable at the semi-automation mode.

At step S312, the assigning block 608 of the CMS 206 assigns the semiconductor process to the EQ 204 operable at the semi-automation mode.

At step S314, the commanding block 610 of the CMS 206 sends the transportation command to the AGV 214 so that the lot of semiconductor wafers can be transported to the EQ 204 operable at the semi-automation mode.

At step S316, the AGV 214, responsive to the transportation command, transports the lot of semiconductor wafers to the EQ 204 operable at the semi-automation mode.

At step S318, the EQ 204 operable at the semi-automation mode processes the lot of semiconductor wafers according to the job file. That is, the EQ 204 operable at the semi-automation mode applies the overlay process to the lot of semiconductor wafers according to the job file.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for processing a lot of semiconductor wafers, wherein the lot is defined as a predetermined number of semiconductor wafers, comprising:
    a first semiconductor processing means operable at a first operating mode for processing the lot of the semiconductor wafers according to a job file representing data required for a semiconductor process;
    a second semiconductor processing means operable at a second operating mode for processing the lot of the semiconductor wafers according to the job file;
    a determining means for determining whether said first semiconductor processing means has the job file; and
    an assigning means for assigning the semiconductor process to said first semiconductor processing means or said second semiconductor processing means depending on presence of the job file;
    a providing means for providing the job file to said second semiconductor processing means if said first semiconductor processing means has not the job file.

2. The apparatus as recited in claim 1, further comprising:
    a transportation means for transporting a semiconductor wafer cassette containing the lot of semiconductor wafers to said first semiconductor processing means or said second semiconductor processing means in response to a transportation command.

3. The apparatus as recited in claim 2, further comprising a commanding means for sending the transportation command to said transportation means.

4. The apparatus as recited in claim 3, wherein the first operating mode includes a full-automation mode.

5. The apparatus as recited in claim 4, wherein the second operating mode includes a semi-automation mode.

6. The apparatus as recited in claim 5, wherein the job file includes identification information of the semiconductor process and an executable file for executing the semiconductor process.

7. The apparatus as recited in claim 6, further comprising a stocking means for stocking the semiconductor wafer cassette.

8. The apparatus as recited in claim 7, wherein said first and second semiconductor processing means includes an overlay equipment.

9. The apparatus as recited in claim 8, wherein said overlay equipment includes:
    a first overlay equipment operable at the full-automation mode for applying an overlay process to the lot of semiconductor wafers according to the job file; and
    a second overlay equipment operable at the semi-automation mode for applying the overlay process to the lot of semiconductor wafers according to the job file.

10. A semiconductor factory automation (FA) system for processing a lot of semiconductor wafers, wherein the lot is defined as a predetermined number of semiconductor wafers, comprising:
    a first semiconductor processing means operable at a first operating mode for processing the lot of the semiconductor wafers according to a job file representing data required for a semiconductor process;
    a second semiconductor processing means operable at a second operating mode for processing the lot of the semiconductor wafers according to the job file;

a determining means for determining whether said first semiconductor processing means has the job file;

an assigning means for assigning the semiconductor process to said first semiconductor processing means or said second semiconductor processing means depending on presence of the job file; and a providing means for providing the job file to said second semiconductor processing means if said first semiconductor processing means has not the job file.

11. The semiconductor FA system as recited in claim 10, further comprising:

a transportation means for transporting a semiconductor wafer cassette containing the lot of semiconductor wafers to said first semiconductor processing means or said second semiconductor processing means in response to a transportation command.

12. The semiconductor FA system as recited in claim 11, further comprising a commanding means for sending the transportation command to said transportation means.

13. The semiconductor FA system as recited in claim 12, wherein the first operating mode includes a full-automation mode.

14. The semiconductor FA system as recited in claim 13, wherein the second operating mode includes a semi-automation mode.

15. The semiconductor FA system as recited in claim 14, wherein the job file includes identification information of the semiconductor process and an executable file for executing the semiconductor process.

16. The semiconductor FA system as recited in claim 15, further comprising a stocking means for stocking the semiconductor wafer cassette.

17. The semiconductor FA system as recited in claim 16, wherein said first and second semiconductor processing means includes an overlay equipment for applying an overlay process to the lot of semiconductor wafers according to the job file.

18. The semiconductor FA system as recited in claim 17, wherein said overlay equipment includes:

a first overlay equipment operable at the full-automation mode for applying an overlay process to the lot of semiconductor wafers according to the job file; and a second overlay equipment operable at the semi-automation mode for applying the overlay process to the lot of semiconductor wafers according to the job file.

19. A method for processing a lot of semiconductor wafers in a semiconductor factory automation (FA) system, wherein the lot is defined as a predetermined number of semiconductor wafers, comprising the steps of:

a) determining whether a first process equipment operable at a first operating mode has a job file corresponding to the lot of semiconductor wafers, wherein the job file represents data required for a semiconductor process;

b) if the first process equipment operable at the first operating mode has the job file, processing the lot of semiconductor wafers according to the job file in the first process equipment, the step b) includes the steps of:

b1) if the first process equipment operable at the first operating mode has the job file, assigning the semiconductor process to the first process equipment;

b2) sending a transportation command from a cell management server to an automatic guide vehicle so that the lot of semiconductor wafers can be transported to the first process equipment;

b3) transporting the lot of semiconductor wafers to the first process equipment in response to the transportation command; and b4) processing the lot of semiconductor wafers according to the job file in the first process equipment;

c) if the first process equipment operable at the first operating mode has not the job file, providing the job file to a second process equipment operable at a second operating mode; and d) processing the lot of semiconductor wafers according to the job file in the second process equipment.

20. The method as recited in claim 19, wherein said step d) includes the steps of:

d1) assigning the semiconductor process to the second process equipment;

d2) sending the transportation command from the cell management server to the automatic guide vehicle so that the lot of semiconductor wafers can be transported to the second process equipment;

d3) transporting the lot of semiconductor wafers to the second process equipment in response to the transportation command; and d4) processing the lot of semiconductor wafers according to the job file in the second process equipment.

21. The method as recited in claim 20, wherein the first operating mode includes a full-automation mode.

22. The method as recited in claim 21, wherein the second operating mode includes a semi-automation mode.

23. The method as recited in claim 22, wherein the job file includes identification information of the semiconductor process and an executable file for executing the semiconductor process.

24. The method as recited in claim 23, wherein said step b4) includes a step of applying an overlay process to the lot of semiconductor wafers according to the job file in the first process equipment.

25. The method as recited in claim 24, wherein said step d4) includes a step of applying the overlay process to the lot of semiconductor wafers according to the job file in the second process equipment.

26. A computer-readable media storing program instructions, the program instructions disposed on a computer to perform a method for processing a lot of semiconductor wafers in a semiconductor factory automation (FA) system, wherein the lot is defined as a predetermined number of semiconductor wafers, comprising the steps of:

a) determining whether a first process equipment operable at a first operating mode has a job file corresponding to the lot of semiconductor wafers, wherein the job file represents data required for a semiconductor process;

b) if the first process equipment operable at the first operating mode has the job file, processing the lot of semiconductor wafers according to the job file in the first process equipment, wherein said step b) includes the steps of:

b1) if the first process equipment operable at the first operating mode has the job file, assigning the semiconductor process to the first process equipment;

b2) sending a transportation command from a cell management server to an automatic guide vehicle so that the lot of semiconductor wafers can be transported to the first process equipment;

b3) transporting the lot of semiconductor wafers to the first process equipment in response to the transportation command; and b4) processing the lot of semiconductor wafers according to the job file in the first process equipment;

c) if the first process equipment operable at the first operating mode has not the job file, providing the job file to a second process equipment operable at a second operating mode; and d) processing the lot of semiconductor wafers according to the job file in the second process equipment.

27. The computer-readable media as recited in claim 26, wherein said step d) includes the steps of:

d1) assigning the semiconductor process to the second process equipment;

d2) sending the transportation command from the cell management server to the automatic guide vehicle so that the lot of semiconductor wafers can be transported to the second process equipment;

d3) transporting the lot of semiconductor wafers to the second process equipment in response to the transportation command; and d4) processing the lot of semiconductor wafers according to the job file in the second process equipment.

28. The computer-readable media as recited in claim 27, wherein the first operating mode includes a full-automation mode.

29. The computer-readable media as recited in claim 28, wherein the second operating mode includes a semi-automation mode.

30. The computer-readable media as recited in claim 29, wherein the job file includes identification information of the semiconductor process and an executable file for executing the semiconductor process.

31. The computer-readable media as recited in claim 30, wherein said step b4) includes a step of applying an overlay process to the lot of semiconductor wafers according to the job file in the first process equipment.

32. The computer-readable media as recited in claim 31, wherein said step d4) includes a step of applying the overlay process to the lot of semiconductor wafers according to the job file in the second process equipment.

* * * * *